US010277334B2

United States Patent
Yoo et al.

(10) Patent No.: US 10,277,334 B2
(45) Date of Patent: Apr. 30, 2019

(54) HYBRID OFDM BODY COUPLED COMMUNICATION TRANSCEIVER

(71) Applicant: Khalifa University of Science and Technology, Abu Dhabi (AE)

(72) Inventors: Jerald Yoo, Singapore (SG); Wala Saadeh, Lahore (PK)

(73) Assignee: Khalifa University of Science and Technology, Abu Dhabi (AE)

( * ) Notice: Subject to any disclaimer, the term of this patent is extended or adjusted under 35 U.S.C. 154(b) by 0 days.

(21) Appl. No.: 15/803,711

(22) Filed: Nov. 3, 2017

(65) Prior Publication Data

US 2018/0123704 A1    May 3, 2018

Related U.S. Application Data

(60) Provisional application No. 62/416,711, filed on Nov. 3, 2016.

(51) Int. Cl.
| | |
|---|---|
| *H04W 4/80* | (2018.01) |
| *H04B 13/00* | (2006.01) |
| *H04L 27/26* | (2006.01) |
| *H04L 27/12* | (2006.01) |
| *H04L 5/00* | (2006.01) |

(52) U.S. Cl.
CPC ......... *H04B 13/005* (2013.01); *H04L 5/0012* (2013.01); *H04L 27/12* (2013.01); *H04L 27/265* (2013.01); *H04L 27/2634* (2013.01); *H04L 27/2697* (2013.01); *H04W 4/80* (2018.02)

(58) Field of Classification Search
CPC ...... H04B 13/005; H04W 4/80; H04W 4/008; H04L 27/2634; H04L 27/265

USPC ........................................................ 455/41.2
See application file for complete search history.

(56) References Cited

U.S. PATENT DOCUMENTS

| | | | | |
|---|---|---|---|---|
| 5,862,182 | A * | 1/1999 | Awater | H04J 13/10 370/209 |
| 6,990,062 | B2 * | 1/2006 | Greaves | H04L 5/143 370/208 |
| 7,386,072 | B2 * | 6/2008 | Uno | H04L 25/0204 370/204 |
| 7,418,070 | B2 * | 8/2008 | Naito | H04L 27/262 370/304 |
| 7,512,185 | B2 * | 3/2009 | Sharon | H04B 1/7176 375/260 |
| 8,040,970 | B2 * | 10/2011 | Pare, Jr. | H04B 7/0413 375/219 |

(Continued)

OTHER PUBLICATIONS

Latif et al., "Signal Properties of Hybrid LFSK Modulated MQAM (HQFM) OFDM Transceiver", IJCSNS, vol. 7, No. 11, Nov. 2007, pp. 72-76.*

(Continued)

*Primary Examiner* — Hai V Nguyen
(74) *Attorney, Agent, or Firm* — Withrow & Terranova, P.L.L.C.

(57) ABSTRACT

A radio-frequency (RF) body-coupled communications (BCC) transceiver is disclosed according to one embodiment of the present disclosure. The RF BCC transceiver includes an RF BCC transmitter and an RF BCC receiver, such that the RF BCC transmitter transmits an RF signal to the RF BCC receiver via a body area network (BAN) of a human body.

19 Claims, 9 Drawing Sheets

(56) References Cited

U.S. PATENT DOCUMENTS

| | | | | |
|---|---|---|---|---|
| 8,275,074 B2* | 9/2012 | Reial | H04J 11/0063 | 370/210 |
| 8,340,032 B2* | 12/2012 | Choi | H04L 1/0015 | 370/278 |
| 8,351,524 B2* | 1/2013 | Zhou | H04B 7/0854 | 370/206 |
| 8,488,684 B2* | 7/2013 | Park | H04L 25/03171 | 370/329 |
| 8,537,760 B2* | 9/2013 | Tee | H04L 5/0007 | 370/322 |
| 8,811,547 B2* | 8/2014 | Fazzi | H04B 13/005 | 375/343 |
| 8,818,300 B2* | 8/2014 | Falck | A61B 5/0028 | 455/100 |
| 8,866,760 B2* | 10/2014 | Corroy | H04B 13/005 | 340/10.42 |
| 8,886,125 B2* | 11/2014 | Agrawal | H04W 76/14 | 455/41.3 |
| 8,989,102 B2* | 3/2015 | Kenney | H04L 27/2613 | 370/328 |
| 9,059,813 B2 | 6/2015 | Kim | H04L 5/0053 | |
| 9,129,532 B2 | 9/2015 | Rubin | G08G 1/166 | |
| 9,154,353 B2 | 10/2015 | Woodsum | H04L 27/2601 | |
| 9,166,748 B2 | 10/2015 | Kim | H04J 11/00 | |
| 9,288,091 B2 | 3/2016 | Seol | H04L 1/18 | |
| 9,300,517 B2 | 3/2016 | Park | H04L 27/3405 | |
| 9,331,884 B2 | 5/2016 | Hong | H04L 27/3405 | |
| 9,351,100 B2 | 5/2016 | Tarnhed | H04W 84/10 | |
| 9,351,333 B1* | 5/2016 | Zhang | H04W 84/12 | |
| 9,369,215 B2* | 6/2016 | Rudland | H04B 13/005 | |
| 9,385,907 B2* | 7/2016 | bin Mohd Yussof | H04L 27/2628 | |
| 9,419,849 B2* | 8/2016 | Zhang | H04L 1/0046 | |
| 9,608,844 B2* | 3/2017 | Tang | H04L 25/0204 | |
| 9,634,817 B2* | 4/2017 | Zhang | H04L 1/1671 | |
| 9,680,603 B2* | 6/2017 | Azizi | H04L 1/0057 | |
| 9,699,013 B2* | 7/2017 | Trojer | H04J 4/00 | |
| 9,735,940 B1* | 8/2017 | Bakr | H04L 5/0053 | |
| 9,769,005 B2* | 9/2017 | Kim | H04L 27/32 | |
| 9,819,527 B2* | 11/2017 | Mohamed | H04L 27/2627 | |
| 9,825,744 B2* | 11/2017 | Sagong | H04L 5/005 | |
| 9,871,684 B2* | 1/2018 | Woodsum | H04L 27/2639 | |
| 9,936,053 B2* | 4/2018 | Srinivasa | H04L 29/0653 | |
| 9,941,980 B2* | 4/2018 | Ouzounov | H04B 13/005 | |
| 9,979,584 B2* | 5/2018 | Wang | H04L 27/106 | |
| 9,998,311 B2* | 6/2018 | Woodsum | H04L 27/2601 | |
| 2003/0050945 A1* | 3/2003 | Chen | G06F 17/142 | 708/404 |
| 2004/0233836 A1* | 11/2004 | Sumasu | H04L 27/2618 | 370/206 |
| 2004/0264561 A1* | 12/2004 | Alexander | H04L 25/0204 | 375/232 |
| 2005/0195765 A1* | 9/2005 | Sharon | H04B 1/7176 | 370/330 |
| 2005/0265476 A1* | 12/2005 | Naito | H04L 27/2618 | 375/299 |
| 2006/0135075 A1* | 6/2006 | Tee | H04L 5/0007 | 455/67.13 |
| 2006/0285479 A1* | 12/2006 | Han | H04B 7/0678 | 370/203 |
| 2008/0027501 A1* | 1/2008 | Haubrich | A61N 1/37276 | 607/34 |
| 2008/0103551 A1* | 5/2008 | Masoud | A61N 1/37252 | 607/59 |
| 2008/0187136 A1* | 8/2008 | Zhang | H04L 1/1671 | 380/270 |
| 2009/0285325 A1* | 11/2009 | Zhou | H04B 7/0854 | 375/267 |
| 2010/0002644 A1* | 1/2010 | Choi | H04L 1/0015 | 370/329 |
| 2010/0067596 A1* | 3/2010 | Park | H04L 25/03171 | 375/262 |
| 2010/0279607 A1* | 11/2010 | Ida | H01Q 1/243 | 455/41.1 |
| 2011/0200150 A1* | 8/2011 | Fazzi | H04B 13/005 | 375/343 |
| 2011/0227856 A1* | 9/2011 | Corroy | H04B 13/005 | 345/173 |
| 2011/0249709 A1* | 10/2011 | Shiue | H04L 27/2649 | 375/219 |
| 2012/0171954 A1* | 7/2012 | Rudland | H04B 13/005 | 455/41.1 |
| 2012/0176237 A1* | 7/2012 | Tabe | A61B 5/6804 | 340/539.12 |
| 2013/0017836 A1* | 1/2013 | Chang | H01Q 1/1257 | 455/452.1 |
| 2013/0039302 A1* | 2/2013 | Miki | H04L 5/001 | 370/329 |
| 2013/0279491 A1* | 10/2013 | Rubin | G08G 1/166 | 370/347 |
| 2014/0064403 A1* | 3/2014 | Woodsum | H04L 27/2601 | 375/295 |
| 2014/0241232 A1* | 8/2014 | Damji | H04L 25/0204 | 370/312 |
| 2014/0348117 A1* | 11/2014 | Zhang | H04L 1/1671 | 370/329 |
| 2015/0023397 A1* | 1/2015 | Kim | H04J 11/00 | 375/146 |
| 2015/0195027 A1* | 7/2015 | Jung | H04B 7/0617 | 375/267 |
| 2015/0230118 A1* | 8/2015 | Lim | H04L 27/10 | 370/252 |
| 2015/0230201 A1* | 8/2015 | Son | H04W 68/005 | 370/311 |
| 2015/0278562 A1* | 10/2015 | Adrangi | G06K 7/10237 | 455/41.1 |
| 2015/0288489 A1* | 10/2015 | Azizi | H04L 1/0057 | 370/210 |
| 2015/0312704 A1* | 10/2015 | Tarnhed | H04W 84/10 | 455/41.1 |
| 2015/0341200 A1* | 11/2015 | bin Mohd Yussof | H04L 27/2628 | 370/204 |
| 2015/0349981 A1* | 12/2015 | Tang | H04L 25/0204 | 375/260 |
| 2016/0028571 A1* | 1/2016 | Woodsum | H04L 27/2601 | 375/295 |
| 2016/0094895 A1* | 3/2016 | Stadelmeier | H04H 20/59 | 725/33 |
| 2016/0142106 A1* | 5/2016 | Pernisek | H02J 50/10 | 455/41.1 |
| 2016/0142239 A1* | 5/2016 | Woodsum | H04B 7/0617 | 375/295 |
| 2016/0191120 A1* | 6/2016 | Dobyns | H04B 5/0031 | 455/41.1 |
| 2016/0323130 A1* | 11/2016 | Kenney | H04L 1/0041 | |
| 2017/0005846 A1* | 1/2017 | Mohamed | H04L 27/2627 | |
| 2017/0111123 A1* | 4/2017 | Ouzounov | H04B 13/005 | |
| 2017/0155439 A1* | 6/2017 | Chang | H04B 7/0617 | |
| 2017/0257250 A1* | 9/2017 | He | H04L 27/32 | |
| 2017/0288829 A1* | 10/2017 | Srinivasa | H04L 1/0057 | |
| 2017/0318325 A1* | 11/2017 | Ortiz | H04N 21/436 | |

OTHER PUBLICATIONS

Saadeh et al., A Hybrid OFDM Body Coupled Communication Transceiver for Binaual Hearing Aids in 65nm CMOS, IEEE, Sep. 2015, pp. 2620-2623.*

Saadeh et al., "A 1.1 mW Hybrid OFDM Ground Effect-Resilient Body Coupled Communication Transceiver for Head and Body Area Network", IEEE Asian Solid-State Circuits Conference, Nov. 7-9, 2016/Toyama, Japan, pp. 201-204.*

Bae, J., et al., "A 0.24-nJ/b Wireless Body-Area-Network Transceiver With Scalable Double-FSK Modulation," IEEE Journal of Solid-State Circuits, vol. 47, No. 1, Jan. 2012, pp. 310-322.

Chandra, R., et al., "A Link Loss Model for the On-Body Propagation Channel for Binaural Hearing Aids," IEEE Transactions on

(56) References Cited

OTHER PUBLICATIONS

Antennas and Propagation, vol. 61, No. 12, Dec. 2013, pp. 6180-6190.
Chen, F., et al., "A 1mW 1Mb/s 7.75-to-8.25GHz chirp-UWB transceiver with low peak-power transmission and fast synchronization capability," 2014 IEEE International Solid-State Circuits Conference Digest of Technical Papers (ISSCC), Feb. 9-13, 2014, San Francisco, California, USA, pp. 162-164.
Cho, N., et al., "The Human Body Characteristics as a Signal Transmission Medium for Intrabody Communication," IEEE Transactions on Microwave Theory and Techniques, vol. 55, No. 5, May 2007, pp. 1080-1086.
Fort, A., et al., "Ultra-wideband channel model for communication around the human body," IEEE Journal on Selected Areas in Communications, vol. 24, No. 4, Apr. 2006, pp. 927-933.
Liu, Y. H., et al., "A 1.9nJ/b 2.4GHz multistandard (Bluetooth Low Energy/Zigbee/IEEE802.15.6) transceiver for personal/body-area networks," 2013 IEEE International Solid-State Circuits Conference Digest of Technical Papers (ISSCC), Feb. 17-21, 2013, San Francisco, California, USA, pp. 446-448.
Phonak Insight, "It's sync or stream: The difference between wireless hearing aid features and Binaural VoiceStream Technology™," Informational Publication, Oct. 2013, 4 pages.
Saadeh, W., et al., "A Pseudo OFDM With Miniaturized FSK Demodulation Body-Coupled Communication Transceiver for Binaural Hearing Aids in 65 nm CMOS," IEEE Journal of Solid-State Circuits, vol. 52, No. 3, Mar. 2017, pp. 757-768.
Saadeh, W., et al., "A 1.1-mW Ground Effect-Resilient Body-Coupled Communication Transceiver With Pseudo OFDM for Head and Body Area Network," IEEE Journal of Solid-State Circuits, vol. 52, No. 10, Oct. 2017, pp. 2690-2701.
Shrestha, S. L., et al., "A Group of People Acts like a Black Body in a Wireless Mesh Network," 2007 IEEE Global Telecommunications Conference, Nov. 26-30, 2007, Washington, D.C., USA, pp. 4834-4839.
Wang, X., et al., "A meter-range UWB transceiver chipset for around-the-head audio streaming," 2012 IEEE International Solid-State Circuits Conference Digest of Technical Papers (ISSCC), Feb. 19-23, 2012, San Francisco, California, USA, pp. 450-452.
Welch, T., et al., "The Effects of the Human Body on UWB Signal Propagation in an Indoor Environment," IEEE Journal on Selected Areas in Communications, vol. 20, No. 9, Dec. 2002, pp. 1778-1782.
World Health Organization, "Millions of People in the World Have Hearing Loss that Can Be Treated or Prevented," Informational Publication, 2013, 20 pages.
Yoo, J., et al., "Analysis of Body Sensor Network Using Human Body as the Channel," 2008 Proceedings of the 3rd International ICST Conference on Body Area Networks, Mar. 13-17, 2008, Tempe, Arizona, USA, 4 pages.

\* cited by examiner

HYBRID OFDM BODY COUPLED COMMUNICATION TRANSCEIVER

RELATED APPLICATIONS

This application claims the benefit of provisional patent application Ser. No. 62/416,711 filed Nov. 3, 2016, the disclosure of which is hereby incorporated herein by reference in its entirety.

FIELD OF THE DISCLOSURE

The present disclosure relates to radio frequency (RF) communications transceivers, which may be coupled to a human body.

BACKGROUND

Communications around a human head such as in binaural hearing aids, MP3 Players and helmet-mounted displays, RF transceivers (TRX) are ineffective due to a body shadowing effect and high attenuation. Although body channel communication devices may achieve high energy efficiency while communicating in the vicinity of the human body, the quality of communication may be highly influenced by the environmental variables including human body posture, movement, and skin-electrodes impedance variation. As such, there is a need for an RF communications transceiver that functions well in the vicinity of the human body.

SUMMARY

A radio-frequency (RF) body-coupled communications (BCC) transceiver (TRX) is disclosed according to a first embodiment of the present disclosure. The RF BCC transceiver includes an RF BCC transmitter and an RF BCC receiver, such that the RF BCC transmitter transmits an RF signal to the RF BCC receiver via a body area network (BAN) of a human body.

A hybrid orthogonal frequency-division multiplexing (H-OFDM) TRX is disclosed according to a second embodiment of the present disclosure. The H-OFDM includes an RF transmitter and an RF receiver. The RF transmitter includes a baseband phase-shift keying (BPSK) modulator and inverse fast Fourier transform processing (IFFT) block, which processes transmit (TX) data to provide a baseband TX signal. The RF transmitter further includes a frequency hopping (FH) and frequency shift keying (FSK) RF modulator, which RF modulates the baseband TX signal to provide an RF TX signal. The RF receiver includes an FSK receiver, which receives and down converts an RF receive (RX) signal to provide a baseband RX signal. The RF receiver further includes a fast Fourier transform (FFT) processing block and BPSK demodulator, which processes the baseband RX signal to provide RX data.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
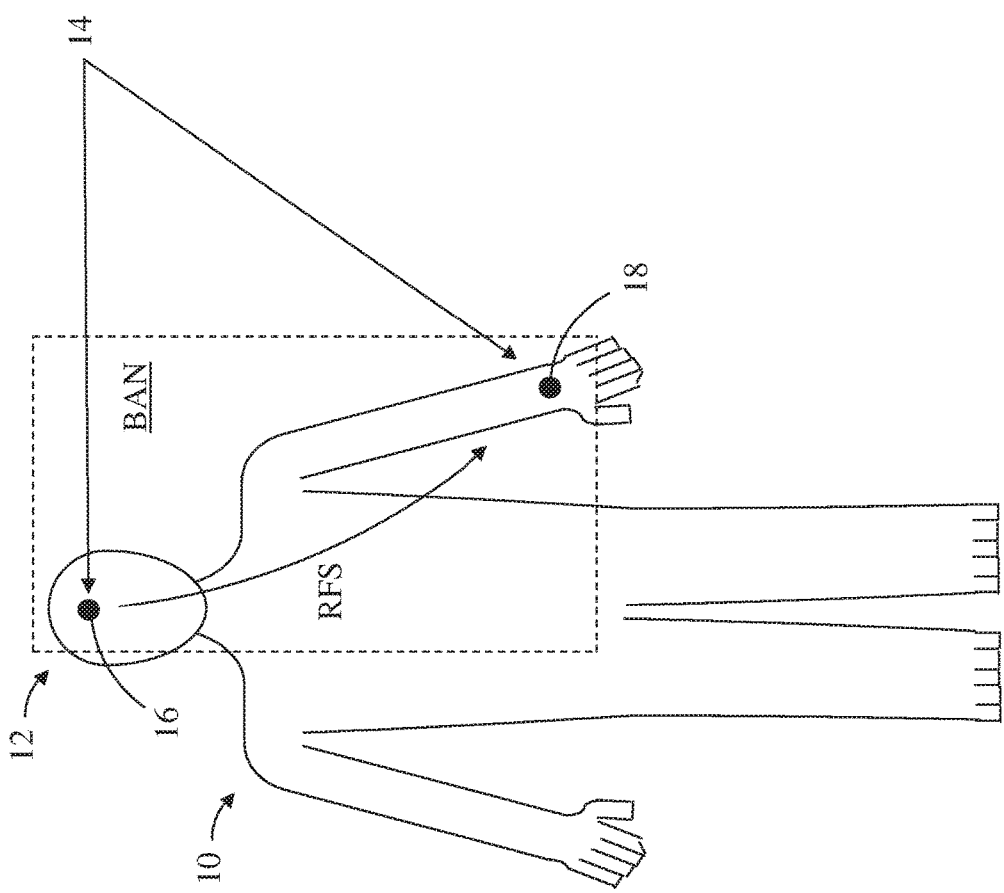
FIG. 1 illustrates a human body including a head, an RF BCC TRX, and a body area network according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

RF Body-Coupled Communications Transceiver

A radio-frequency (RF) body-coupled communications (BCC) transceiver (TRX) is disclosed according to a first embodiment of the present disclosure. The RF BCC transceiver includes an RF BCC transmitter and an RF BCC receiver, such that the RF BCC transmitter transmits an RF signal to the RF BCC receiver via a body area network (BAN) of a human body.

Hybrid-OFDM Transceiver

A hybrid orthogonal frequency-division multiplexing (H-OFDM) TRX is disclosed according to a second embodiment of the present disclosure. The H-OFDM includes a physical layer (PHY) transmitter and a PHY receiver. The PHY transmitter includes a baseband phase-shift keying (BPSK) modulator and inverse fast Fourier transform processing (IFFT) block, which processes transmit (TX) data to provide a baseband TX signal. The PHY transmitter further includes a frequency hopping (FH) and frequency shift keying (FSK) modulator, which modulates the baseband TX signal to provide an RF TX signal. The RF receiver includes an FSK receiver, which receives and down converts an RF receive (RX) signal to provide a baseband RX signal. The RF receiver further includes an 8-point fast Fourier transform (FFT) processing block and BPSK demodulator, which processes the baseband RX signal to provide RX data.

FIG. 1 illustrates a human body 10 including a head 12, an RF BCC TRX 14, and a body area network BAN according to one embodiment of the present disclosure. The RF BCC TRX 14 includes a RF BCC transmitter 16 and an RF BCC receiver 18, such that the RF BCC transmitter 16 transmits an RF signal RFS to the RF BCC receiver 18 via the body area network BAN of the human body 10. The RF BCC transmitter 16 transmits the RF signal RFS to the RF BCC receiver 18 via the head 12 of the human body 10.

Figure 2:
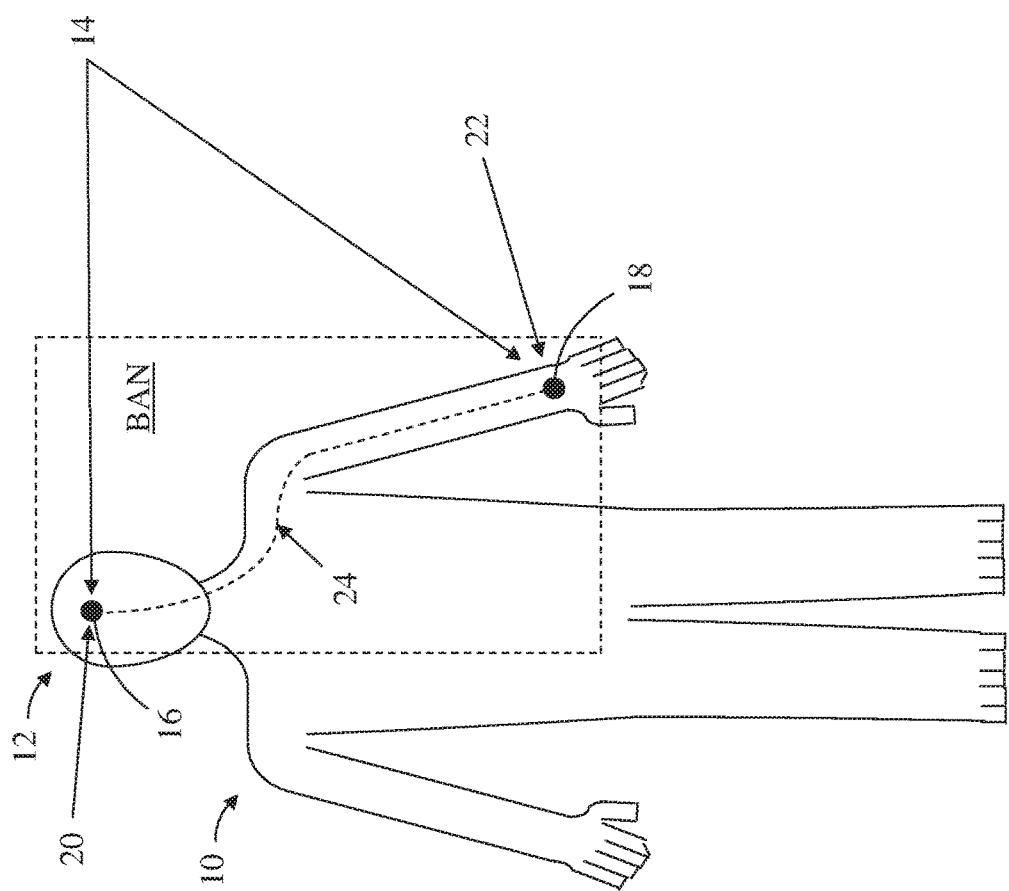
FIG. 2 shows details of the RF BCC TRX and the body area network illustrated in FIG. 1 according to one embodiment of the RF BCC TRX and the body area network.

FIG. 2 shows details of the RF BCC TRX 14 and the body area network BAN illustrated in FIG. 1 according to one embodiment of the RF BCC TRX 14 and the body area network BAN. The RF BCC TRX 14 and the body area network BAN illustrated in FIG. 2 are similar to the RF BCC TRX 14 and the body area network BAN illustrated in FIG. 1, except in the RF BCC TRX 14 and the body area network BAN illustrated in FIG. 2, the body area network BAN of the human body 10 is based on magnetic resonance coupling. In this regard, the RF BCC transmitter 16 includes a transmit coil 20 and the RF BCC receiver 18 includes a receive coil 22. The transmit coil 20 and the receive coil 22 form a pair of magnetically coupled coils 20, 22. The RF BCC transmitter 16 transmits the RF signal RFS (FIG. 1) to the RF BCC receiver 18 using the magnetic resonance coupling between the RF BCC transmitter 16 and the RF BCC receiver 18, such that the magnetic resonance coupling is via magnetic flux 24 between the transmit coil 20 and the receive coil 22. In general, each of the RF BCC transmitter 16 and the RF BCC receiver 18 includes a corresponding one of the pair of magnetically coupled coils 20, 22.

Figure 3:
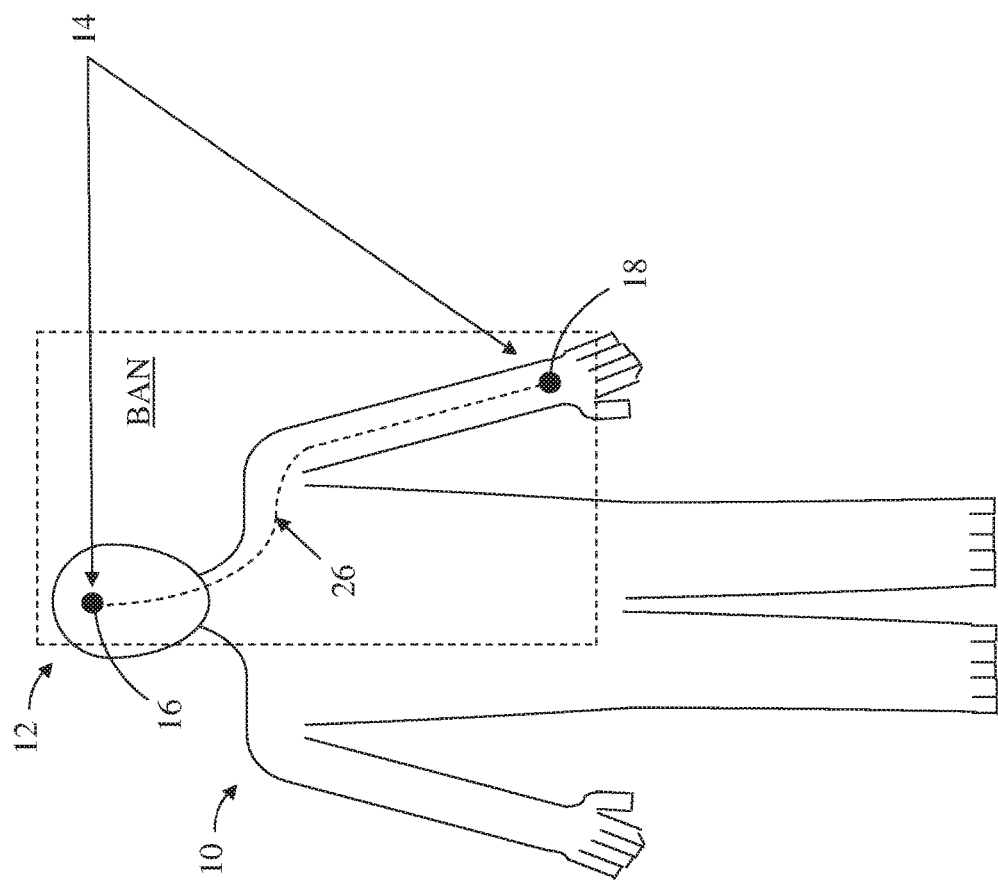
FIG. 3 shows details of the RF BCC TRX and the body area network illustrated in FIG. 1 according to an alternate embodiment of the RF BCC TRX and the body area network.

FIG. 3 shows details of the RF BCC TRX 14 and the body area network BAN illustrated in FIG. 1 according to an alternate embodiment of the RF BCC TRX 14 and the body area network BAN. The RF BCC TRX 14 and the body area network BAN illustrated in FIG. 3 are similar to the RF BCC TRX 14 and the body area network BAN illustrated in FIG. 1, except in the RF BCC TRX 14 and the body area network BAN illustrated in FIG. 3, the RF BCC transmitter 16 transmits the RF signal RFS to the RF BCC receiver 18 using galvanic current 26 from the RF BCC transmitter 16 to the RF BCC receiver 18 via the human body 10.

Figure 4:
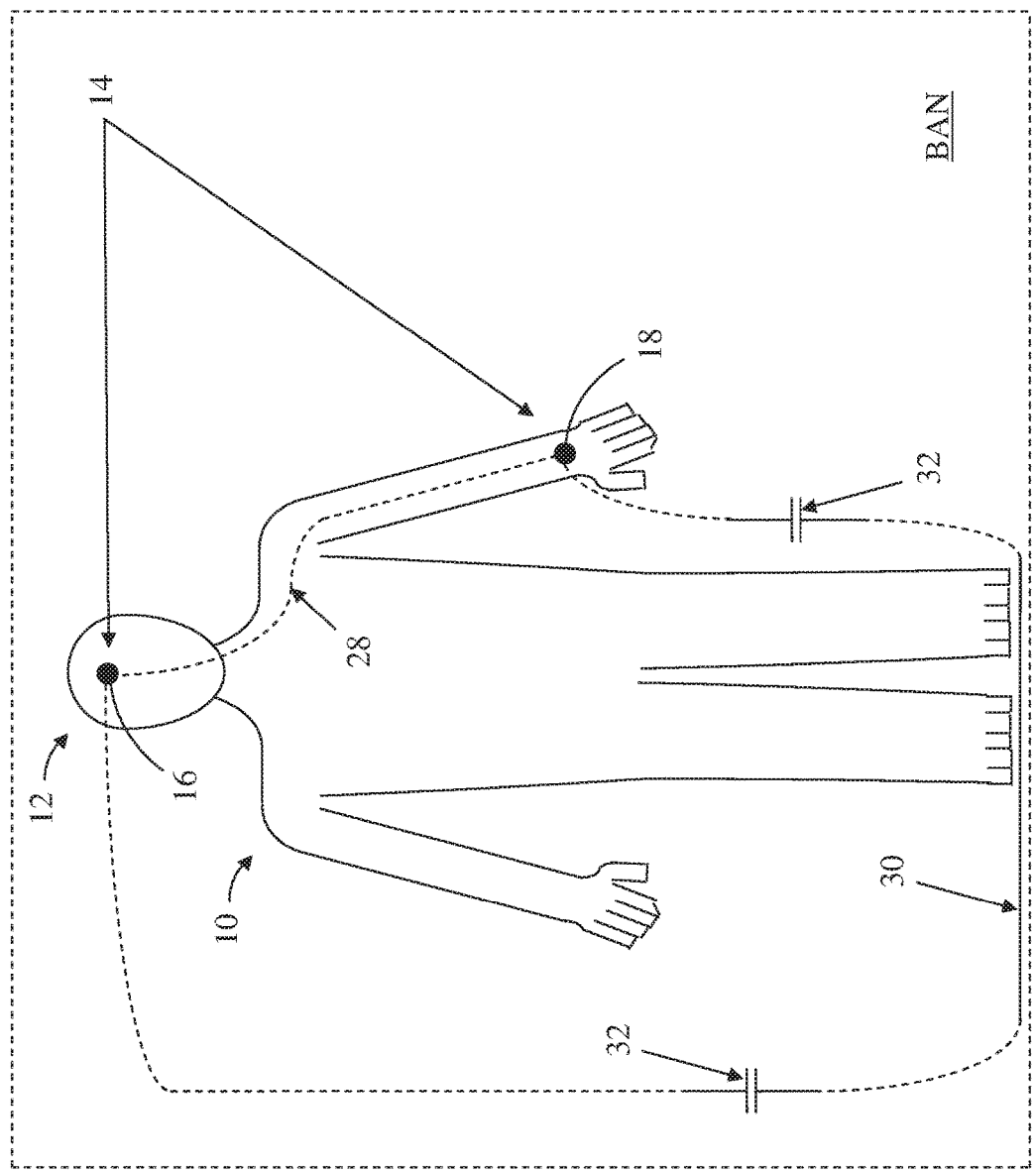
FIG. 4 shows details of the RF BCC TRX and the body area network illustrated in FIG. 1 according to an additional embodiment of the RF BCC TRX and the body area network.

FIG. 4 shows details of the RF BCC TRX 14 and the body area network BAN illustrated in FIG. 1 according to an additional embodiment of the RF BCC TRX 14 and the body area network BAN. The RF BCC TRX 14 and the body area network BAN illustrated in FIG. 4 are similar to the RF BCC TRX 14 and the body area network BAN illustrated in FIG. 1, except the body area network BAN of the human body 10 illustrated in FIG. 4 has a primary signal path 28 and a return signal path 30. The primary signal path 28 is via the human body 10 and the return signal path 30 is via parasitic capacitance 32 external to the human body 10.

Figure 5:
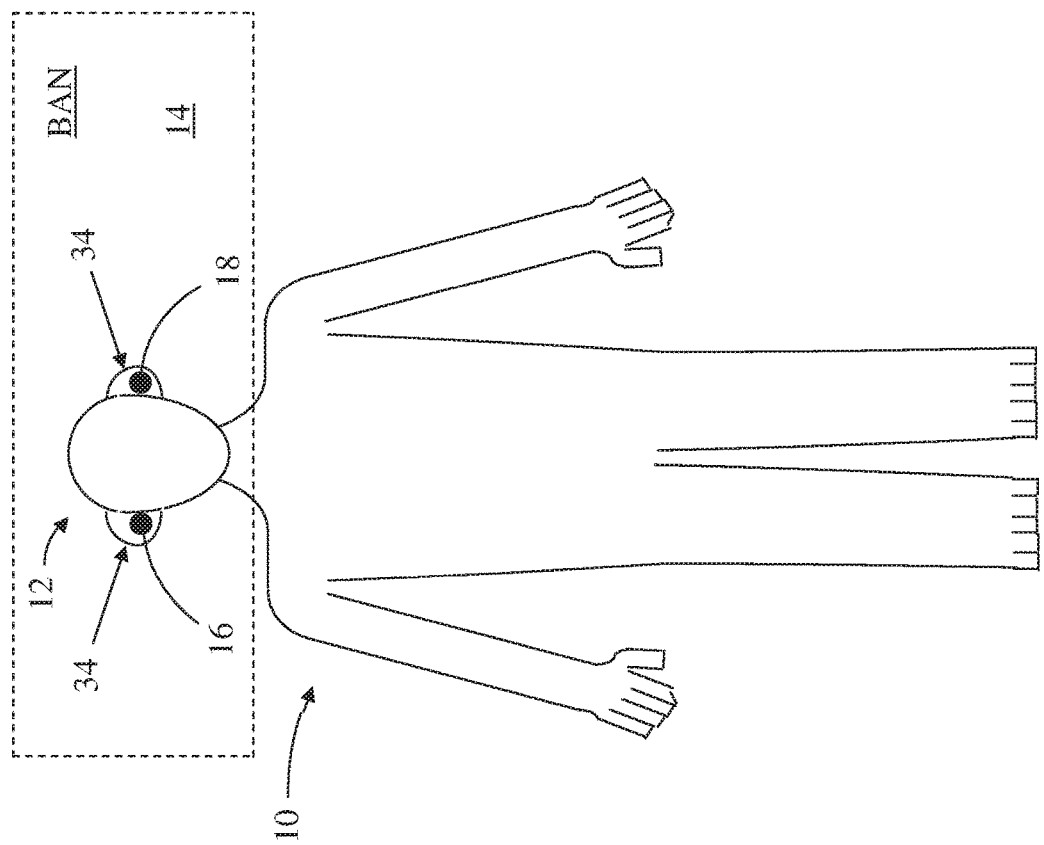
FIG. 5 shows details of the RF BCC TRX and the body area network illustrated in FIG. 1 according to another embodiment of the RF BCC TRX and the body area network.

FIG. 5 shows details of the RF BCC TRX 14 and the body area network BAN illustrated in FIG. 1 according to another embodiment of the RF BCC TRX 14 and the body area network BAN. The human body 10 illustrated in FIG. 5 is similar to the human body 10 illustrated in FIG. 1, except the human body 10 illustrated in FIG. 5 includes a pair of ears 34. The RF BCC transmitter 16 is adjacent to one of the pair of ears 34 and the RF BCC receiver 18 is adjacent to another of the pair of ears 34.

Figure 6:
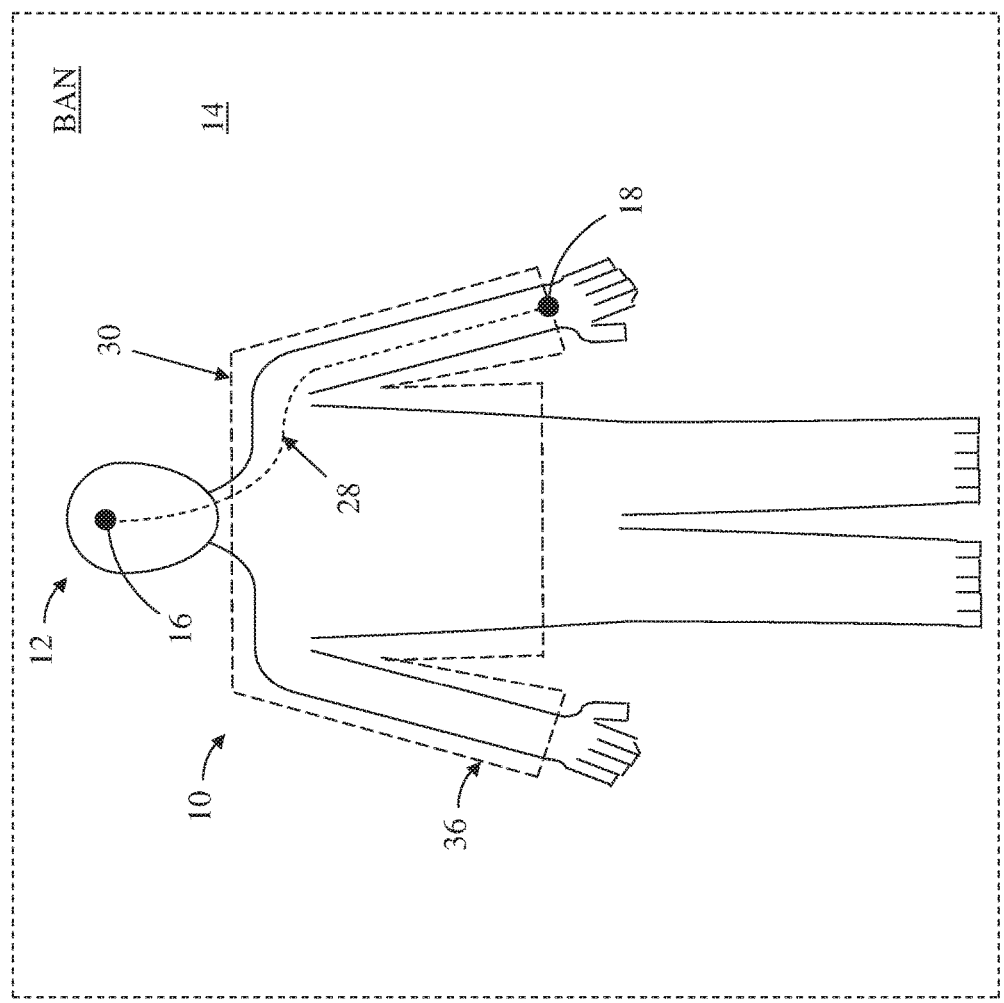
FIG. 6 shows details of the RF BCC TRX and the body area network illustrated in FIG. 1 according to further embodiment of the RF BCC TRX and the body area network.

FIG. 6 shows details of the RF BCC TRX 14 and the body area network BAN illustrated in FIG. 1 according to a further embodiment of the RF BCC TRX 14 and the body area network BAN. The RF BCC TRX 14 and the body area network BAN illustrated in FIG. 6 are similar to the RF BCC TRX 14 and the body area network BAN illustrated in FIG.

4, except in the RF BCC TRX 14 and the body area network BAN illustrated in FIG. 6, at least a portion of the return signal path 30 is provided by clothing 36 worn by the human body 10.

In one embodiment of the RF BCC TRX 14 and the body area network BAN, a connection between the RF BCC transmitter 16 and the human body 10 has a transmitter skin-electrode contact impedance. In this regard, the RF BCC transmitter 16 provides the RF signal RFS such that a signal strength of the RF signal RFS is directly related to an estimate of the transmitter skin-electrode contact impedance.

Figure 7A:
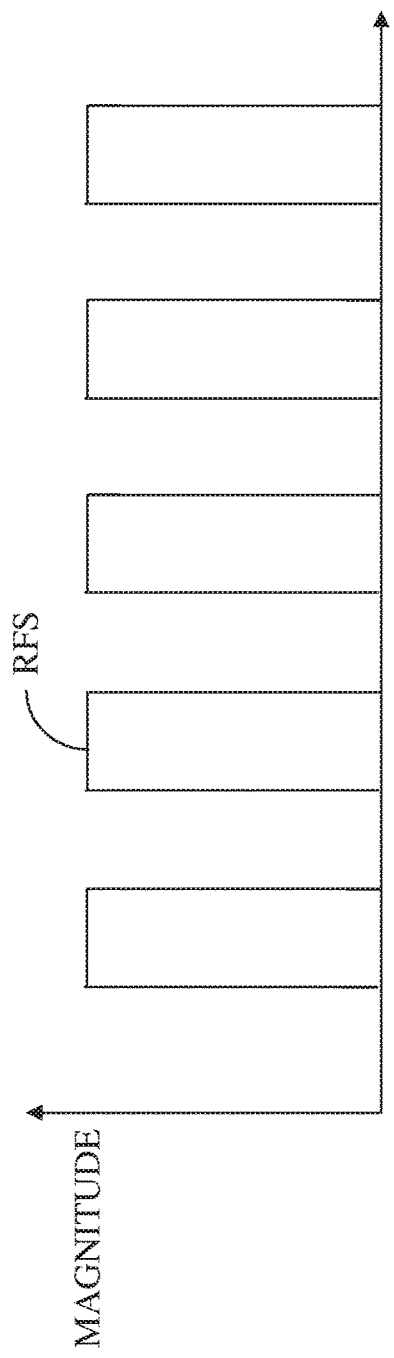
FIGS. 7A and 7B illustrate an RF signal and a delayed RF signal, respectively, according to one embodiment of the present disclosure.
Figure 7B:
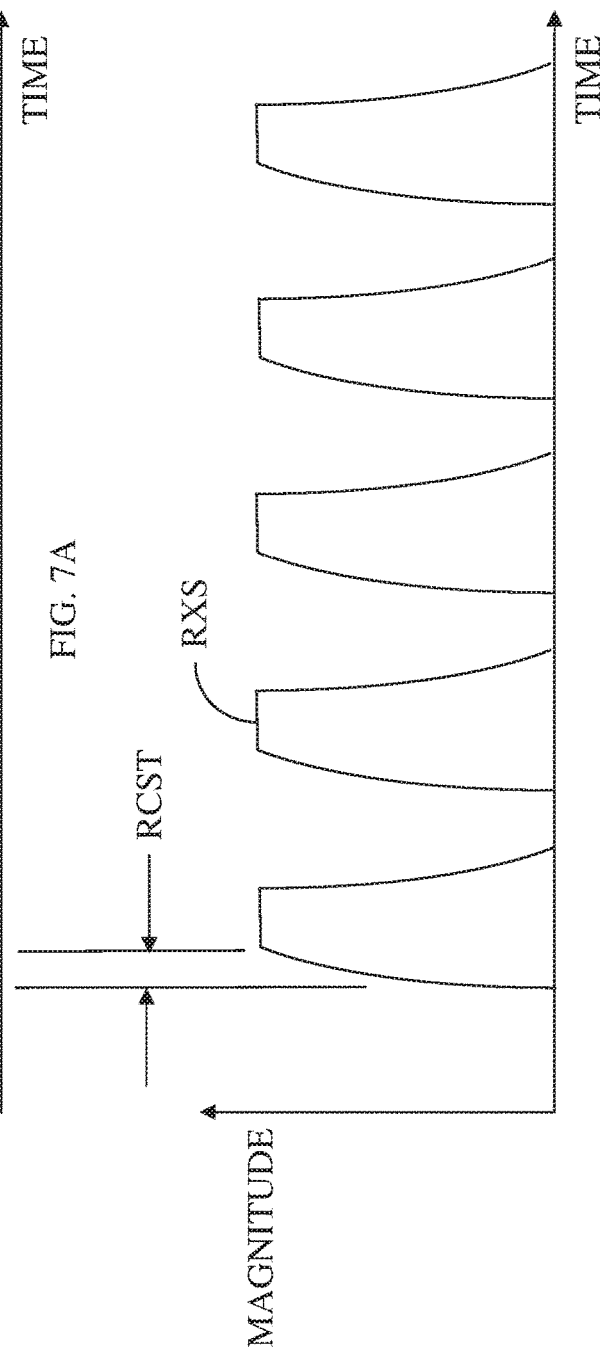

FIGS. 7A and 7B illustrate the RF signal RFS and a delayed RF signal RXS, respectively. The delayed RF signal RXS is delayed from the RF signal RFS by a resistance/capacitance settling time measurement RCST. In one embodiment of the estimate of the transmitter skin-electrode contact impedance, the estimate of the transmitter skin-electrode contact impedance is based on the resistance/capacitance settling time measurement RCST.

In one embodiment of the RF BCC TRX 14 and the body area network BAN, a connection between the RF BCC receiver 18 and the human body 10 has a receiver skin-electrode contact impedance, such that the signal strength of the RF signal RFS is further directly related to an estimate of the receiver skin-electrode contact impedance. In one embodiment of the RF signal RFS, a signal strength of the RF signal RFS is directly related to a receiver skin-electrode contact impedance.

Figure 8:
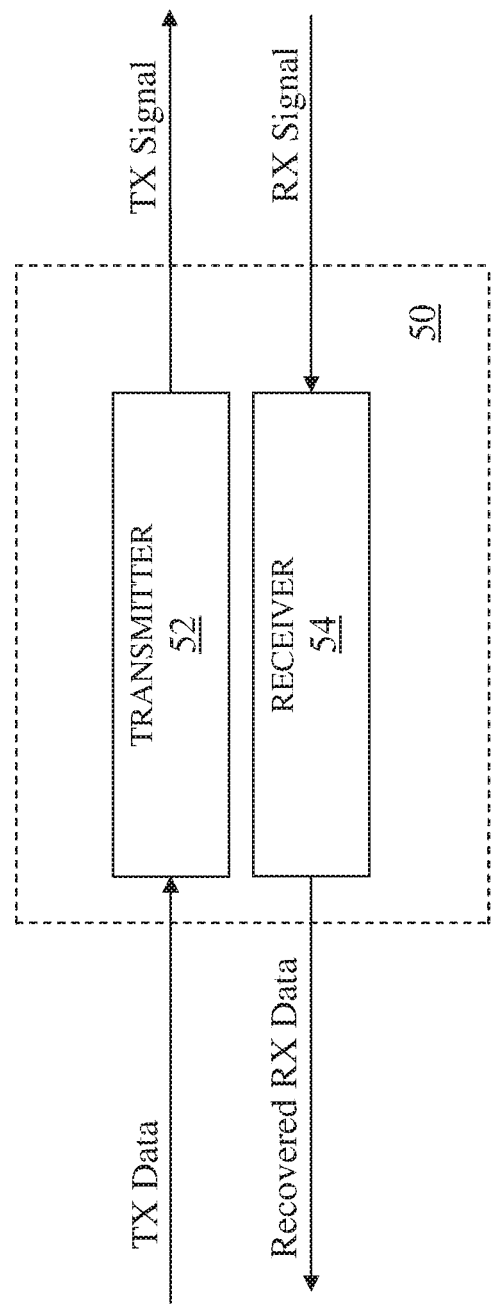
FIG. 8 illustrates a hybrid-orthogonal frequency division multiplexing (H-OFDM) TRX according to one embodiment of the present disclosure.

FIG. 8 illustrates a hybrid-orthogonal frequency division multiplexing (H-OFDM) TRX 50 according to one embodiment of the present disclosure. The H-OFDM TRX 50 includes a transmitter 52 and a receiver 54. The transmitter 52 receives and processes TX Data to provide a TX signal. The receiver 54 receives and processes an RX signal to provide Recovered RX Data. In one embodiment of the receiver 54, the receiver 54 amplifies the RX signal to provide an amplified RX signal.

Figure 9:
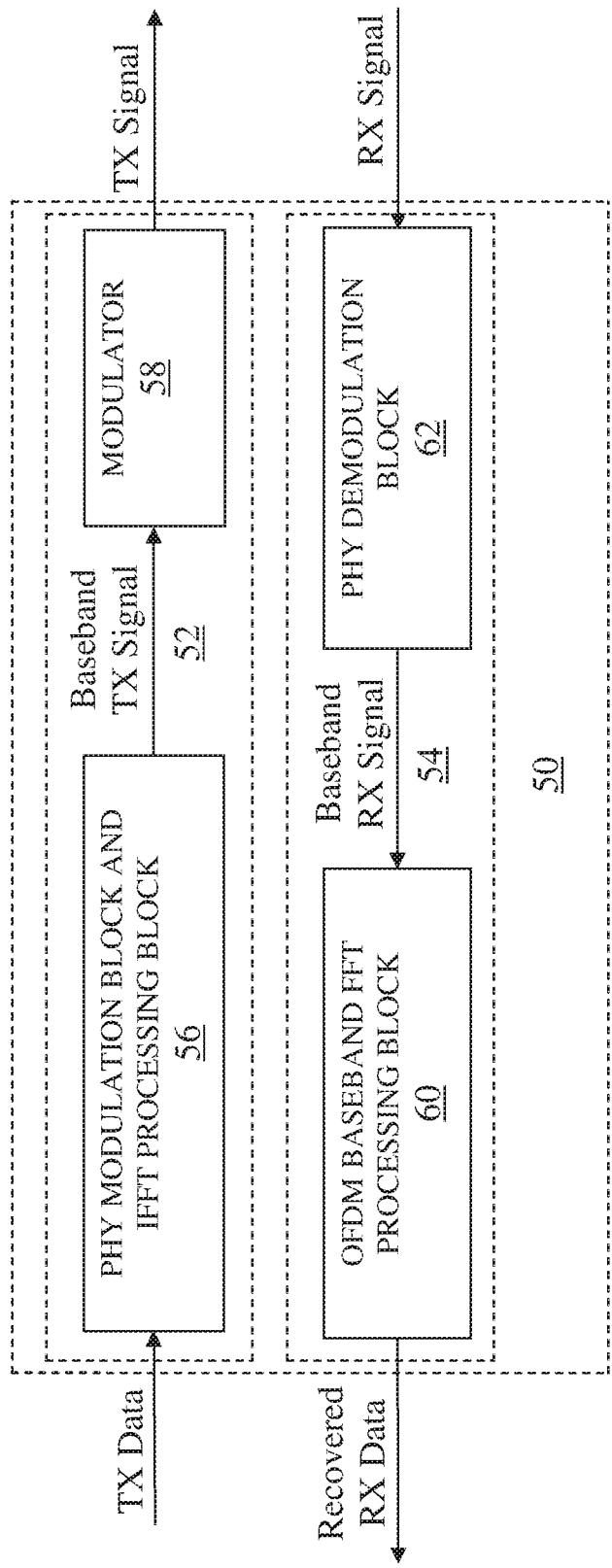
FIG. 9 shows details of the H-OFDM TRX illustrated in FIG. 8 according to one embodiment of the H-OFDM TRX.

FIG. 9 shows details of the H-OFDM TRX 50 illustrated in FIG. 8 according to one embodiment of the H-OFDM TRX 50. The transmitter 52 includes a physical layer (PHY) modulation block and inverse fast Fourier transform (IFFT) processing block 56 to process TX data to provide a Baseband TX signal. The transmitter 52 further includes a modulator 58 to modulate the baseband TX signal to provide a TX signal. In one embodiment of the modulator 58, the modulator 58 includes an RF TX amplifier to amplify the TX signal to provide an amplified TX signal, such that the TX signal is an RF signal. In one embodiment of the RF TX amplifier, a gain of the RF TX amplifier is adjustable.

The receiver 54 includes an OFDM baseband fast Fourier transform (FFT) processing block 60 and a PHY demodulation block 62. The PHY demodulation block 62 receives and down converts an RX signal to provide a baseband RX signal. The OFDM baseband FFT processing block 60 processes the baseband RX signal to provide the recovered RX data. In one embodiment of the PHY modulation block and IFFT processing block 56, the PHY modulation block and IFFT processing block 56 calculates an 8-point IFFT to provide the Baseband TX Signal. In one embodiment of the OFDM baseband FFT processing block 60, the OFDM baseband FFT processing block 60 calculates an 8-point FFT using division by the square root of 2.

Those skilled in the art will recognize improvements and modifications to the preferred embodiments of the present disclosure. All such improvements and modifications are considered within the scope of the concepts disclosed herein and the claims that follow.

What is claimed is:

1. A radio-frequency (RF) body-coupled communications (BCC) transceiver (TRX) configured to function as a hybrid orthogonal frequency-division multiplexing (H-OFDM) TRX and comprising:
   an RF BCC transmitter, comprising:
      a baseband phase-shift keying (BPSK) modulator and an inverse fast Fourier transform (IFFT) processing block configured to process transmit (TX) data to provide a baseband TX signal; and
      a frequency hopping (FH) and frequency shift keying (FSK) RF modulator configured to RF modulate the baseband TX signal to provide an RF TX signal; and
   an RF BCC receiver;
   wherein the RF BCC transmitter is configured to transmit the RF TX signal to the RF BCC receiver via a body area network (BAN) of a human body.

2. The RF BCC TRX of claim 1 wherein the RF BCC transmitter is further configured to transmit the RF TX signal to the RF BCC receiver via a head of the human body.

3. The RF BCC TRX of claim 1 wherein the BAN of the human body is configured to be based on magnetic resonance coupling, such that the RF BCC transmitter is further configured to transmit the RF TX signal to the RF BCC receiver using the magnetic resonance coupling between the RF BCC transmitter and the RF BCC receiver, wherein each of the RF BCC transmitter and the RF BCC receiver comprises a corresponding one of a pair of magnetically coupled coils.

4. The RF BCC TRX of claim 1 wherein the BAN of the human body is configured to be galvanic current based, such that the RF BCC transmitter is further configured to transmit the RF TX signal to the RF BCC receiver using the galvanic current from the RF BCC transmitter to the RF BCC receiver via the human body.

5. The RF BCC TRX of claim 1 wherein the RF BCC transmitter is configured to be located adjacent to one ear of a pair of ears of the human body and the RF BCC receiver is configured to be located adjacent to another ear of the pair of ears.

6. The RF BCC TRX of claim 1 wherein the BAN of the human body comprises a primary signal path and a return signal path, such that the primary signal path is via the human body and the return signal path is via parasitic capacitance external to the human body.

7. The RF BCC TRX of claim 6 wherein at least a portion of the return signal path is configured to be provided by clothing worn by the human body.

8. The RF BCC TRX of claim 1 wherein a connection between the RF BCC transmitter and the human body comprises a transmitter skin-electrode contact impedance, such that a signal strength of the RF TX signal is directly related to an estimate of the transmitter skin-electrode contact impedance.

9. The RF BCC TRX of claim 8 wherein the estimate of the transmitter skin-electrode contact impedance is based on a resistance/capacitance settling time measurement.

10. The RF BCC TRX of claim 8 wherein a connection between the RF BCC receiver and the human body has a receiver skin-electrode contact impedance, such that the signal strength of the RF TX signal is further directly related to an estimate of the receiver skin-electrode contact impedance.

11. The RF BCC TRX of claim 1, wherein:
the IFFT processing block is an
   8-point IFFT processing block; and
the RF BCC receiver comprises:
   an FSK receiver configured to receive and down convert an RF receive (RX) signal to provide a baseband RX signal; and
   an 8-point fast Fourier transform (FFT) processing block and BPSK demodulator configured to process the baseband RX signal to provide RX data.

12. The RF BCC TRX of claim 11 further comprising control circuitry configured to provide the TX data and receive the RX data.

13. The RF BCC TRX of claim 11 wherein the 8-point FFT processing block and BPSK demodulator is configured to calculate an 8-point FFT using division by the square root of 2.

14. The RF BCC TRX of claim 11 wherein:
the FH and FSK RF modulator comprises an RF TX amplifier configured to amplify the RF TX signal to provide an amplified RF TX signal; and
the FSK receiver comprises an RF RX amplifier configured to receive and amplify the RF RX signal.

15. The RF BCC TRX of claim 14 wherein:
a gain of the RF TX amplifier is adjustable;
a gain of the RF RX amplifier is adjustable;
the FH and FSK RF modulator further comprises a TX impedance monitor configured to monitor an impedance associated with the amplified RF TX signal; and
the FSK receiver further comprises an RX impedance monitor configured to monitor an impedance associated with the RF RX signal.

16. A hybrid orthogonal frequency-division multiplexing (H-OFDM) transceiver (TRX) comprising:
a transmitter comprising:
   a physical layer (PHY) modulation block and inverse fast Fourier transform (IFFT) processing block configured to calculate an 8-point IFFT and process transmit (TX) data to provide a baseband TX signal; and
   a modulator configured to modulate the baseband TX signal to provide a TX signal; and
a receiver comprising:
   a PHY demodulation block configured to receive and down convert a receive (RX) signal to provide a baseband RX signal; and
   an OFDM baseband fast Fourier transform (FFT) processing block configured to process the baseband RX signal to provide recovered RX data.

17. A hybrid orthogonal frequency-division multiplexing (H-OFDM) transceiver (TRX) comprising:
a transmitter comprising:
   a physical layer (PHY) modulation block and an inverse fast Fourier transform (IFFT) processing block configured to process transmit (TX) data to provide a baseband TX signal; and
   a modulator configured to modulate the baseband TX signal to provide a TX signal; and
a receiver comprising:
   a PHY demodulation block configured to receive and down convert a receive (RX) signal to provide a baseband RX signal; and
   an OFDM baseband fast Fourier transform (FFT) processing block configured to calculate an 8-point FFT using division by the square root of 2 and process the baseband RX signal to provide recovered RX data.

18. The H-OFDM TRX of claim 16 wherein:
the modulator comprises a radio-frequency (RF) TX amplifier configured to amplify the TX signal to provide an amplified TX signal, wherein the TX signal is an RF signal; and
the receiver comprises an RF RX amplifier configured to receive and amplify the RX signal.

19. The H-OFDM TRX of claim 18 wherein:
a TX gain of the RF TX amplifier is adjustable;
an RX gain of the RF RX amplifier is adjustable;
the modulator further comprises a TX impedance monitor configured to monitor a TX impedance associated with the amplified TX signal and further configured to adjust the TX gain based on the TX impedance; and
the receiver further comprises an RX impedance monitor configured to monitor an RX impedance associated with the RX signal and further configured to adjust the RX gain based on the RX impedance.

* * * * *